United States Patent
Khitrenovich et al.

(10) Patent No.: US 10,616,196 B1
(45) Date of Patent: Apr. 7, 2020

(54) USER AUTHENTICATION WITH MULTIPLE AUTHENTICATION SOURCES AND NON-BINARY AUTHENTICATION DECISIONS

(71) Applicant: EMC IP Holding Company LLC, Hopkinton, MA (US)

(72) Inventors: Anton Khitrenovich, Kfar-Yona (IL); Oleg Freylafert, Hod Hasharon (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 39 days.

(21) Appl. No.: 14/864,106

(22) Filed: Sep. 24, 2015

(51) Int. Cl.
*H04L 29/06* (2006.01)
*G06N 20/00* (2019.01)

(52) U.S. Cl.
CPC ............. *H04L 63/08* (2013.01); *G06N 20/00* (2019.01)

(58) Field of Classification Search
CPC ..... H04L 63/08; H04L 63/0884; H04L 63/20; H04L 63/10; H04L 63/105; H04L 9/321; H04L 2463/082; H04L 63/0263; H04L 63/0281; G06N 99/005; G06N 20/00
See application file for complete search history.

(56) References Cited

U.S. PATENT DOCUMENTS

| | | | | |
|---|---|---|---|---|
| 8,006,289 B2* | 8/2011 | Hinton | ............... | H04L 63/08 713/156 |
| 8,370,389 B1* | 2/2013 | Dotan | ............... | G06F 21/43 707/781 |
| 8,490,154 B2* | 7/2013 | Gomez | ............... | H04L 63/08 380/2 |
| 8,533,791 B2* | 9/2013 | Samuelsson | ............ | H04L 9/321 726/5 |
| 8,584,219 B1* | 11/2013 | Toole | ............... | G06F 21/60 726/25 |
| 8,949,953 B1 | 2/2015 | Khitrenovich et al. | | |
| 9,032,490 B1 | 5/2015 | Khitrenovich et al. | | |
| 9,485,655 B1* | 11/2016 | Pirrotta | ................. | H04W 12/06 |
| 2002/0188738 A1* | 12/2002 | Gray | ................. | H04L 12/2876 709/229 |
| 2003/0154406 A1 | 8/2003 | Honarvar et al. | | |

(Continued)

*Primary Examiner* — Catherine Thiaw
(74) *Attorney, Agent, or Firm* — Ryan, Mason & Lewis, LLP

(57) ABSTRACT

User authentication techniques are provided for multiple authentication sources and for non-binary authentication decisions. An authentication request is received from an application server to authenticate a user for access to a protected resource. Pre-flow rules and the authentication request are evaluated to dynamically determine a plurality of authentication servers to invoke for the authentication request and an order for the invocation. A first authentication server is contacted to obtain a first authentication result for the user. In-flow rules and the first authentication result are evaluated to determine if additional authentication of the user should be performed. A second authentication server is contacted based on the determined invocation order and/or a result of the in-flow rules to obtain a second authentication result for the user. Decision rules and the first and second authentication results are evaluated to determine an authentication decision. The first authentication result and/or the second authentication result comprise a non-binary result.

19 Claims, 5 Drawing Sheets

(56) References Cited

U.S. PATENT DOCUMENTS

| | | | | |
|---|---|---|---|---|
| 2004/0039917 | A1* | 2/2004 | Ross | G06F 21/31 713/179 |
| 2005/0097320 | A1* | 5/2005 | Golan | G06F 21/40 713/166 |
| 2007/0055871 | A1* | 3/2007 | Ghanea-Hercock | G06F 21/31 713/168 |
| 2008/0010674 | A1* | 1/2008 | Lee | G06F 21/32 726/7 |
| 2008/0244693 | A1* | 10/2008 | Chang | G06F 21/554 726/1 |
| 2012/0159590 | A1* | 6/2012 | Novack | H04L 9/3231 726/7 |
| 2012/0254935 | A1* | 10/2012 | Yato | H04L 9/321 726/1 |
| 2012/0331088 | A1* | 12/2012 | O'Hare | G06F 21/6227 709/214 |
| 2013/0024925 | A1* | 1/2013 | Venkataramani | H04L 63/083 726/7 |
| 2014/0059650 | A1* | 2/2014 | Bhayankara | H04L 67/2819 726/4 |
| 2015/0046969 | A1* | 2/2015 | Abuelsaad | G06F 21/41 726/1 |
| 2015/0254445 | A1* | 9/2015 | Takagi | H04L 63/0861 726/7 |
| 2016/0065570 | A1* | 3/2016 | Spencer, III | G06Q 20/40 726/7 |
| 2016/0087957 | A1* | 3/2016 | Shah | H04L 63/205 726/1 |
| 2016/0117673 | A1 | 4/2016 | Landrok et al. | |
| 2016/0205549 | A1* | 7/2016 | Hoyer | H04W 12/06 713/159 |
| 2016/0337403 | A1* | 11/2016 | Stoops | H04L 63/0861 |
| 2016/0380989 | A1* | 12/2016 | Bailey | H04L 63/08 726/5 |

* cited by examiner

POLICIES 300

PRE-FLOW POLICIES 310 – DEFINE ORDER OF AUTHENTICATION SERVER 150 INVOCATION BEFORE FLOW STARTS

IN-FLOW POLICIES 320 – CHANGE INVOCATION ORDER DYNAMICALLY DURING EXECUTION

POST-FLOW POLICIES 330 – PRODUCE AUTHENTICATION DECISION BASED ON EXECUTION RESULTS

USER AUTHENTICATION WITH MULTIPLE AUTHENTICATION SOURCES AND NON-BINARY AUTHENTICATION DECISIONS

CROSS REFERENCE TO RELATED APPLICATIONS

This patent application is related to U.S. Pat. No. 8,949,953, entitled "Brokering Multiple Authentications Through a Single Proxy;" and U.S. Pat. No. 9,032,490, entitled "Techniques for Authenticating a User With Heightened Security," each filed Sep. 12, 2012 and each incorporated by reference herein.

FIELD

The field relates generally to cryptography, and more particularly to user authentication techniques.

BACKGROUND

In order to gain access to applications, systems, and/or other resources via a computer or another user device, users are often required to authenticate themselves by entering authentication information. Such authentication information may include, for example, passwords, secrets, and/or security tokens.

Application servers, for example, restrict such access by performing user authentication. The application server often delegates responsibility for the authentication to a remote authentication server (e.g., a username/password (U/P) authentication server) by sending an access request message to the remote authentication server. In a multi-factor authentication system, after the remote authentication server authenticates the user, the application server initiates additional authentication by sending a second access request message to a second remote authentication server. Such multi-factor authentication is processed sequentially, where a user must pass a previous authentication in order to attempt to pass a subsequent authentication.

A need remains for improved multi-factor authentication techniques that provide flexibility to adjust to changing environments and can accommodate non-binary authentication methods.

SUMMARY

One or more illustrative embodiments of the present invention provide user authentication with multiple authentication sources and non-binary authentication decisions. In accordance with one embodiment of the invention, a first method is provided comprising the steps of receiving an authentication request from an application server seeking to authenticate a user for access to a protected resource associated with the application server; evaluating one or more pre-flow rules and one or more characteristics of the authentication request to dynamically determine a plurality of authentication servers to invoke for the authentication request and an order for the invocation; communicating with at least a first authentication server based on the determined invocation order to provide first authentication information of the user to the first authentication server and to obtain a first authentication result for the user from the first authentication server; evaluating one or more in-flow rules and the first authentication result to determine if additional authentication of the user should be performed prior to determining a final authentication decision; communicating with at least a second authentication server based on one or more of the determined invocation order and a result of the evaluation of the one or more in-flow rules to provide second authentication information of the user to the second authentication server and to obtain a second authentication result for the user from the second authentication server, wherein the second authentication server is distinct from the first authentication server and performs an authentication type distinct from the authentication type of the first authentication server; and evaluating one or more decision rules and the first authentication result and the second authentication result to determine an authentication decision, wherein at least one of the first authentication result and the second authentication result comprise a non-binary result.

In one or more exemplary embodiments, the invocation order comprises a list of authentication servers to contact sequentially and/or in parallel. The in-flow rules optionally change the invocation order for the user dynamically during the authentication of the user.

In one or more exemplary embodiments, the decision rules combine the first and second authentication results into the authentication decision, which comprises one or more of accept, reject and proceed to at least a third authentication server. The decision rules are optionally customer-specific and can be updated using machine learning techniques.

The methods and devices of the illustrative embodiments overcome one or more of the problems associated with the conventional techniques described previously, and provide for user authentication with multiple authentication sources and non-binary authentication decisions. These and other features and advantages of the present invention will become more readily apparent from the accompanying drawings and the following detailed description.

DETAILED DESCRIPTION

Figure 1:
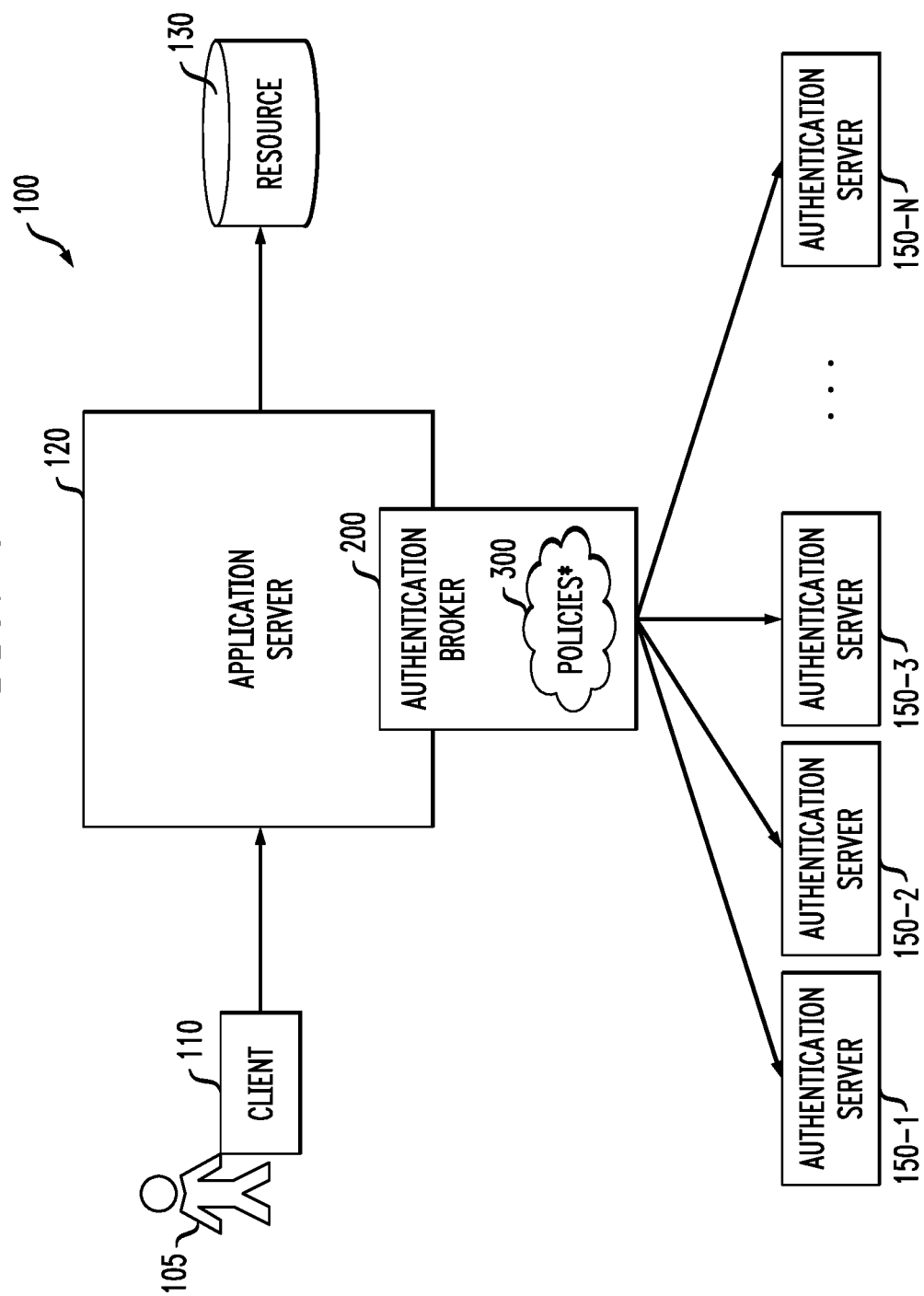
FIG. 1 is a diagram illustrating an example network environment in which one or more embodiments of the present invention can operate.

Illustrative embodiments of the present invention will be described herein with reference to exemplary communication systems, cryptographic devices and authentication devices, and associated servers, clients and other processing devices. It is to be appreciated, however, that the invention is not restricted to use with the particular illustrative system and device configurations shown. Accordingly, the term "communication system" as used herein is intended to be broadly construed, so as to encompass, for example, systems in which multiple processing devices communicate with one another but not necessarily in a manner characterized by a client-server model.

In addition, the term "cryptographic device," as used herein, is intended to be construed broadly so as to encompass any type of processing device that incorporates cryptographic functionality (such as a computer, server, mobile telephone, radio-frequency identification (RFID) tag or reader, authentication token, etc.). Similarly, the term "authentication server" should be understood to encompass any type of processing device or set of such devices that is operative to authenticate information provided by an authentication token generator or other type of device. As used herein, an "authentication server" need not be a network-based server, and may be implemented as a portion of a device that performs other functions, as a combination of multiple servers or other devices, or in other forms.

Additionally, the term "authentication information," as used herein, is intended to include passwords, passcodes, security tokens, answers to life questions, biometric information, device information, or other authentication credentials, or values derived from such authentication credentials, or more generally any other information that a user may be required to submit in order to obtain access to an access-controlled application or resource. Also, the term "cryptographic information," as used herein, is intended to include any number, value, key, or other information utilized in furtherance of a cryptographic function or process.

As will be described, the present invention in one or more illustrative embodiments provides methods and apparatus for user authentication with multiple authentication sources and non-binary authentication decisions.

In one or more exemplary embodiments, an authentication broker contacts multiple authentication servers (that can be local modules or remote servers). The authentication broker dynamically determines which authentication sources to invoke for a specific authentication request and in what order (e.g., sequentially, in parallel or a combination thereof).

According to one aspect of the invention, the authentication broker accepts both binary responses (e.g., 0=accept and 1=reject) and non-binary responses from authentication sources. For example, non-binary responses may comprise risk scores from risk-based authentication, assurance levels of biometric authentication and/or response timeouts from authentication sources that did not respond in a timely manner.

According to another aspect of the invention, the authentication broker employs static or dynamic authentication policies to combine authentication responses into an authentication decision (e.g., accept, reject or proceed to one or more additional authentication sources, potentially requiring additional input from the end user). The decision logic of invoking the authentication sources, as well as the decision based on their response can optionally be customer-specific and optionally tuned automatically with machine learning capabilities. One example of decision logic can be "accept user if two out of three authentication servers accept user." Another example can be "calculate weighted average of results, and accept user only if the total score is greater than 0.8 and a particular server accepted, or invoke additional authentication if total score is between 0.5 and 0.8."

FIG. 1 is a diagram illustrating an exemplary network environment 100 in which one or more embodiments of the present invention can operate. As shown in FIG. 1, the exemplary network environment 100 comprises a client machine 110, an application server 120, an authentication broker device 200, as discussed further below in conjunction with FIG. 2, and a plurality of authentication servers 150-1 through 150-N. One or more of the authentication servers 150 may be embodied, for example, as a credential-based authentication (CBA) server and a risk-based authentication (RBA) server, as discussed further below.

Client 110 may be any kind of computing device, such as, for example, a personal computer, a workstation, a server, an enterprise server, a laptop computer, a mobile computer, a smart phone, a tablet computer, etc. A user 105 operates the client 110 in order to attempt to gain access to a protected resource 130 (e.g., a web site, a file share, a virtual private network, a storage array, a camera or a virtual private network) running on, accessible via or protected by the application server 120. For example, the user 105 may desire to access a virtual private network (VPN) accessible via the application server 120 as a VPN gateway. In order to do so, the user 105 executes a login client on the client device 110 and attempts to log in to the application server 120 to access the VPN or another protected resource 130. It should be noted that a user 105 accessing a protected resource 130 guarded by the application server 120 may be considered to be a species of the more generic description of a user 105 accessing a service running on or accessible via the application server 120, since the service may include the application server 120 providing a gateway to the protected resource 130.

Application server 120 may be any kind of computing device, such as, for example, a personal computer, a workstation, a server, an enterprise server, a laptop computer, a mobile computer, a smart phone, a tablet computer, etc., although typically application server 120 will be a server or an enterprise server.

Authentication broker 200 may be any kind of computing device, such as, for example, a personal computer, a workstation, a server, an enterprise server, a laptop computer, a mobile computer, a smart phone, a tablet computer, etc., although typically authentication broker 200 will be a server or an enterprise server. Further detail with respect to authentication broker 200 will be provided below in connection with FIG. 2. In addition, authentication broker device 200 can be external from the application server 120 or embedded in the application server 120, as would be apparent to a person of ordinary skill in the art.

As noted above, the authentication broker 200 employs static or dynamic authentication policies, for example, obtained from a policy store 300, as discussed further below in conjunction with FIG. 3, to combine authentication responses into an authentication decision (e.g., accept, reject or proceed to one or more additional authentication sources, potentially requiring additional input from the end user).

Authentication servers 150 may be any kind of computing device, such as, for example, a personal computer, a workstation, a server, an enterprise server, a laptop computer, a mobile computer, a smart phone, a tablet computer, etc., although typically the authentication servers 150 will be a server or an enterprise server, such as an RSA SecurID™ Appliance (produced by RSA, The Security Division of EMC, based in Hopkinton, Mass.) running Authentication Manager™ software produced by RSA, The Security Division of EMC.

When an authentication server 150 is embodied as a CBA server, for example, the CBA server is configured to perform CBA on credentials provided by client 110 via application server 120 and authentication broker 200. For example, a user 105 of client 110 may type a username and password (U/P) into a login client running on client 110. The username and password, in this example, are the credentials that are sent to the CBA server via application server 120 and authentication broker 200. As another example, a user may operate a token (for example, an RSA SecurID™ token produced by RSA, The Security Division of EMC) to generate a one-time passcode (OTP). The token may be a server or other type of module that is accessible over a network, or the token may be a software component resident on or associated with, for example, the client device 110. As another alternative, the token may be distributed over multiple devices, one of which may be the client device 110. By way of yet another alternative, the token may be resident on and/or connected to an authentication server 150.

The user 105 may either type the OTP into the login client running on client device 110 (possibly together with a username and password) or the token may connect directly to client 110 in order to directly transmit the OTP to the login client. In this example, the credentials may include the OTP (as well as, in some embodiments, also the username and password).

When an authentication server 150 is embodied as an RBA server, for example, the RBA server is configured to perform RBA by collecting additional data from the user 105 and/or client 110 in order to pass the additional data in order for RBA to be performed, such as, for example, Adaptive Authentication™ provided by RSA, The Security Division of EMC. While CBA is a deterministic determination based on the correctness of the credentials, RBA is a complex determination that evaluates a plurality of factors (e.g., number of login attempts, location of the user 105, time since last successful login, time since last login attempt, whether the client 110 has been used for successful logins before, whether the client 110 is known to be used by fraudsters, etc.) associated with a particular transaction (e.g., a login attempt) in order to assess a risk that that particular transaction is fraudulent. In some embodiments, RBA allows for asking a user 105 for more data (e.g., a user-generated challenge question, such as "What high school did you go to?") in suspicious circumstances. In some of these embodiments, this communication of additional data may involve out-of-band communications (e.g., a user 105 receives information via e-mail, short message service (SMS) text message, or telephone and then transmits the received information to the RBA server 150 in-band; user 105 is requested to send additional data to the RBA server adapter via e-mail, SMS text message, or telephone, etc.). The additional data collected by RBA server may include the network address of the client 110, the type and version of the browser and/or login client running on client 110, etc.

The various components of the network environment 100 communicate with one another along communication paths, as shown in FIG. 1. These communication paths may be of any type, but typically they are network-based, for example, over a local area network, a wide area network, a global computer network such as the Internet, a satellite network, a telephone network, cable network or a storage area network, or various portions or combinations of these and other types of networks, although other arrangements are possible, such as, for example, point-to-point connections, serial bus connections, or a fabric of hubs and switches.

The exemplary communications among the system elements 110, 200 and 150 of FIG. 1 to authentication of the user 105 is discussed further below in conjunction with FIG. 4.

It is to be appreciated that a given embodiment of the disclosed system 100 may include multiple instances of one or more of client device 110, application server 120, authentication broker device 200, protected resource 130 and authentication servers 150, and possibly other system components, although the noted instances of such components are shown in the simplified system diagram of FIG. 1 for clarity of illustration.

Client device 110 may also be referred to herein as simply a "user." The term "user," as used in this context, should be understood to encompass, by way of example and without limitation, a user device, a person utilizing or otherwise associated with the device, or a combination of both. An operation described herein as being performed by a user may therefore, for example, be performed by a user device, a person utilizing or otherwise associated with the device, or by a combination of both the person and the device. Similarly, a password, login token, or other authentication information described as being associated with a user may, for example, be associated with a client device 110, a person utilizing or otherwise associated with the device, or a combination of both the person and the device.

As also depicted in FIG. 1, the authentication servers 150 are typically associated with a third party entity, such as an authentication authority, that processes authentication requests on behalf of web servers and other resources, as well as verifies the presented authentication information. Alternatively, in one or more embodiments of the invention, the authentication server 150 can be resident on and/or part of one of the parties and/or entities seeking authentication. For example, in such an implementation, the authentication server 150 could be embedded inside a component such as, for instance, a web browser.

Further, in one or more exemplary embodiments, the protected resource 130 may be, for example, an access-controlled application, a remote application server such as a web site or other software program or hardware device that is accessed by the client device 110. Additionally, as noted above, the protected resource 130 can also be, for example, a separate cryptographic device, a component of a system or separate cryptographic device (such as illustrated in the FIG. 1 example), particular data on a system associated with client device 110, and/or particular data on a system not associated with client device 110. In other words, a protected resource 130 is a resource that grants user access responsive to an authentication process, as will be described in greater detail below.

Accordingly, as discussed above, in order to authenticate a user (such as depicted by client device 110, for example) to a system (such as protected resource 130, for example), a security token or secret (such as a password or a certificate) or another credential can be used. Generally, if the user connecting to a system knows this secret or has the credential, then the user is granted access to the system.

Figures 2, 3:
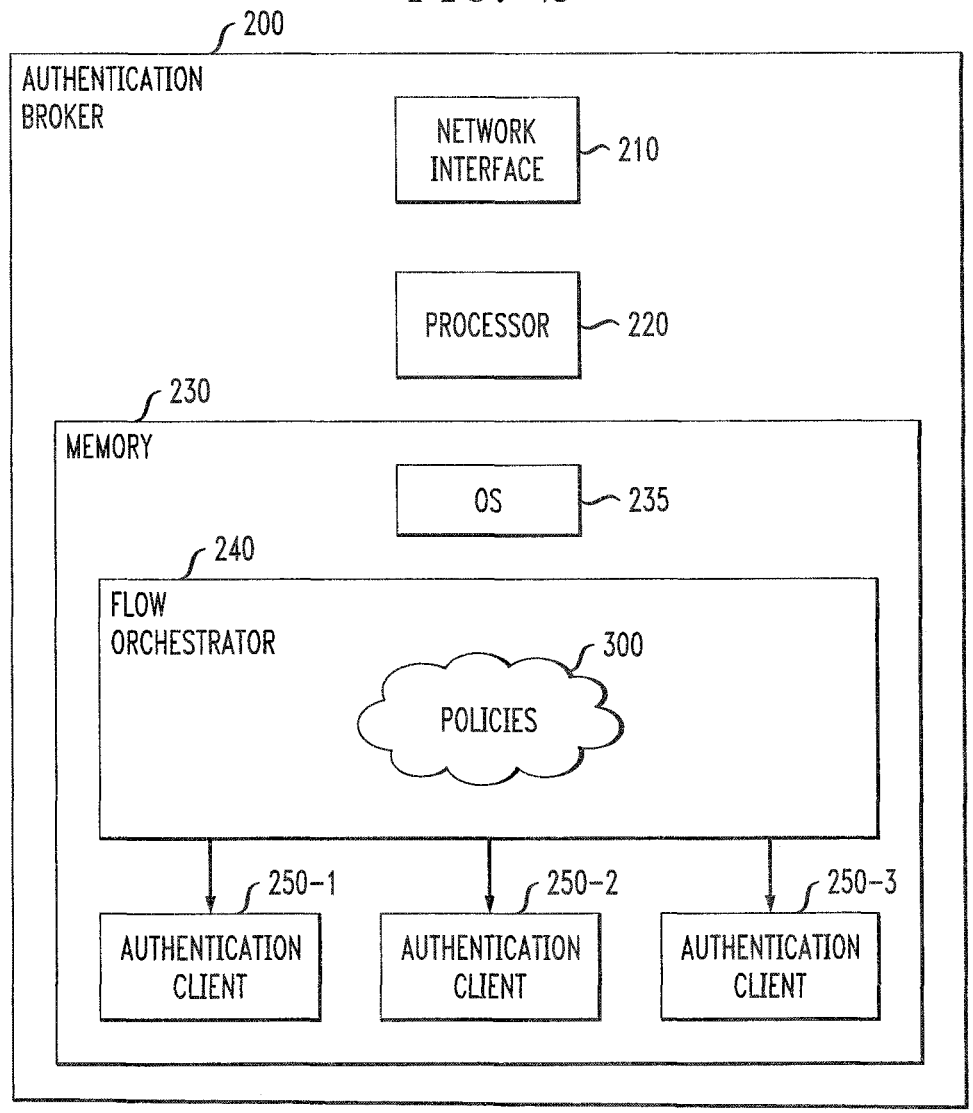
FIG. 2 is a diagram illustrating the authentication broker device of FIG. 1 in further detail.
FIG. 3 illustrates an exemplary policy table employed by the authentication broker device of FIG. 1 in one or more exemplary embodiments.

FIG. 2 is a block diagram of an exemplary authentication broker 200 of FIG. 1 in further detail. As shown in FIG. 2, the exemplary authentication broker 200 includes a network interface 210. Authentication broker 200 is able to communicate with application server 120 and authentication servers 150 using network adapter 210. In some embodiments, these communications are done over separate network connections, while in other embodiments, one network connection may provide communication with more than one of the application server 120 and authentication servers 150.

Authentication broker 200 also contains a processor 220 and memory 230. Processor 220 may be any kind of processor configured to perform operations, such as, for example, a microprocessor, a multi-core microprocessor, a digital signal processor, a collection of electronic circuits, or one or more of the above. As further detailed herein, each such processor (220) is coupled to a memory (230) and configured to implement noted actions internally and/or over a network (via a network interface (210)) in connection with other devices such as, for example, authentication servers 150 and one or more other cryptographic devices.

Memory 230 may be any kind of digital memory, such as, for example, random access memory, read-only memory, static memory, volatile memory, non-volatile memory, system memory, solid-state storage, disk-based storage, or some combination of the above. Memory 230 stores programs executing on processor 220 as well as data used by those programs. Memory 230 stores an operating system 235, a flow orchestrator 240 employing policies 300 (discussed further below in conjunction with FIG. 3), and authentication clients 250-1 through 250-3, all of which run on processor 220. Memory 230 typically includes both a system memory portion for storing programs and data in active use by the processor 220 as well as a persistent storage portion (e.g., solid-state storage and/or disk-based storage) for storing programs and data even while the authentication broker 200 is powered off.

The flow orchestrator 240 can be implemented, for example, as a Remote Authentication Dial In User Service (RADIUS) proxy application and a session broker program. For additional details regarding the RADIUS proxy applications, see, for example, U.S. Pat. No. 8,949,953, referenced above.

Authentication clients, such as authentication clients 250-1 through 250-3, communicate with corresponding authentication servers, such as authentication servers 150-1 through 150-N. The authentication clients 250 can be implemented, for example, as one or more of RADIUS client programs, SOAP (Simple Object Access Protocol) client programs, RSA SecurID™ client programs and Lightweight Directory Access Protocol (LDAP) client programs.

Authentication broker 200 is designed to serve as a front-end for various functions, such as, for example, CBA. In order to do so, it includes the functionality of RADIUS proxy 240, whereby it is able to offload CBA tasks to a remote server, such as a CBA server, which is able to specialize in CBA, while authentication broker 200 is able to perform other tasks. It should be understood that, in some embodiments, the functionality of CBA server may be provided by a CBA application server running on the same machine as authentication broker 200.

FIG. 3 illustrates an exemplary policy table 300 incorporating one or more aspects of the invention. As shown in FIG. 3, the exemplary policy table 300 comprises (i) pre-flow policies 310 that define the order of authentication server 150 invocation before the flow starts (e.g., sequentially, in parallel or a combination thereof); (ii) in-flow policies 320 that change invocation order dynamically during the execution; and (iii) post-flow (or decision) policies 330 that produce an authentication decision based on execution results. The decision policies 330 combine authentication responses into an authentication decision, such as accept, reject or proceed to another authentication server 150, potentially requiring additional input from the user 105.

Examples of each of the pre-flow policies 310, in-flow policies 320 and post-flow (or decision) policies 330 are discussed further below in conjunction with FIG. 4.

Figure 4:
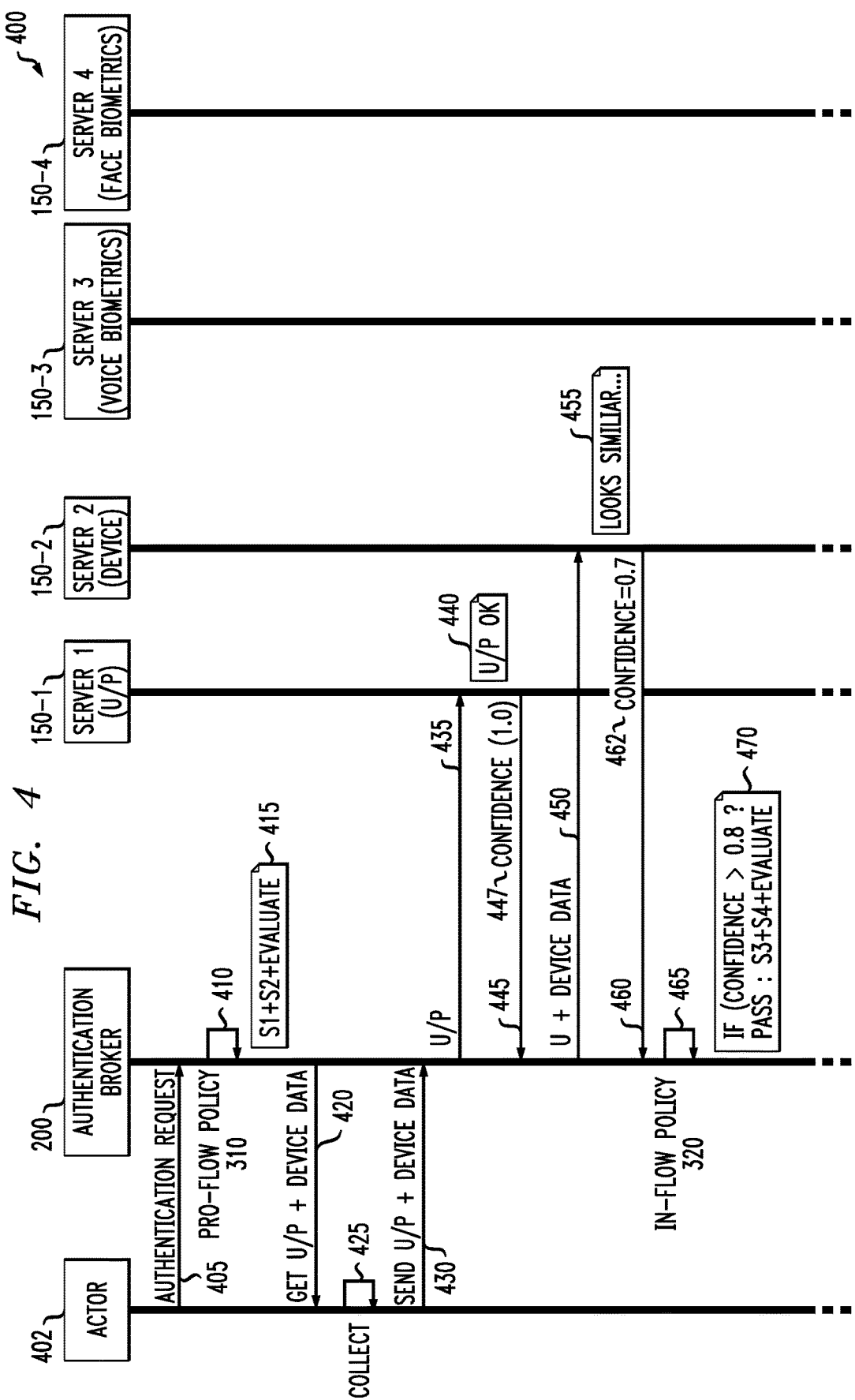
FIG. 4 illustrates an exemplary communication sequence among various entities of FIG. 1 in accordance with an exemplary embodiment of the invention.
Figure 4:
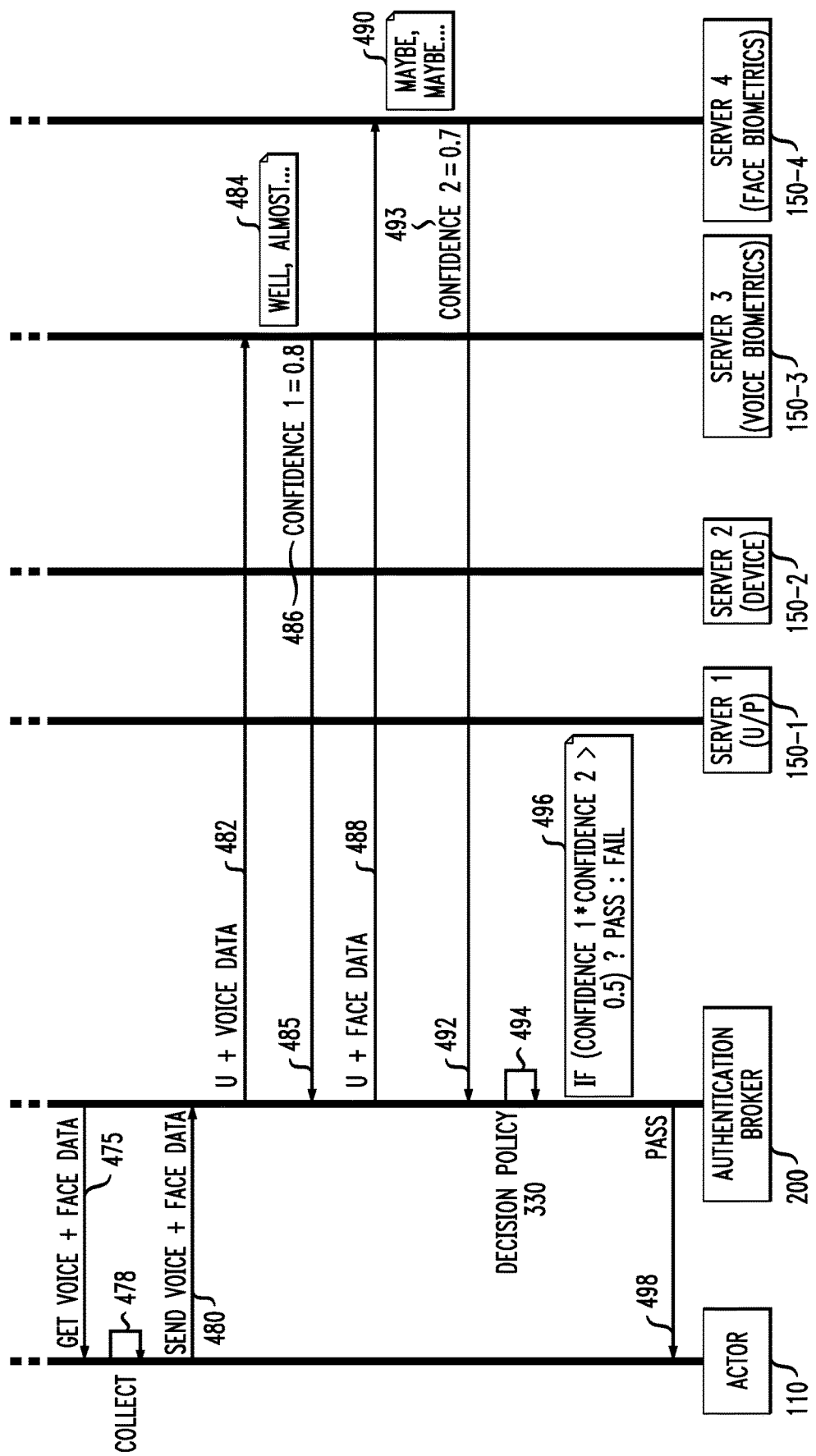

FIG. 4 illustrates an exemplary communication sequence 400 among various entities of FIG. 1 in accordance with an exemplary embodiment of the invention.

As shown in FIG. 4, an actor 402, such as a user 105, client machine 110 or application server 120, initially sends an authentication request to the authentication broker device 200 during step 405. The authentication broker device 200 evaluates a pre-flow policy 310 (FIG. 3) during step 410. For example, an exemplary pre-flow policy 415 might indicate that the authentication broker device 200 should invoke servers 150-1 (S and 150-2 (S2) and then evaluate the next policy 300.

During step 420, the authentication broker device 200 sends a request to the actor 402 for the username/password (U/P) of the user and for device data. The actor 402 collects the requested information during step 425 and provides the collected information to the authentication broker device 200 during step 430.

The authentication broker device 200 provides the username/password of the user to authentication server 150-1, such as a CBA server, during step 435. The authentication server 150-1 evaluates the credentials and makes a determination 440 that the credentials are valid. The authentication server 150-1 provides the acceptance decision to the authentication broker device 200 during step 445 with a confidence level 447.

The authentication broker device 200 provides the username of the user and the device data to authentication server 150-2, such as an RBA server, during step 450. The authentication server 150-2 evaluates the username and device data and makes a determination 455 that the username and device data "look similar" to valid information. The authentication server 150-2 provides the result to the authentication broker device 200 during step 460 with a confidence level 462.

The authentication broker device 200 evaluates the responses from the authentication servers 150-1 and 150-2 during step 465, based on an in-flow policy 320 (FIG. 3). For example, an exemplary in-flow policy 470 might indicate that the authentication broker device 200 should pass the actor 402 if each confidence level 447, 462 is greater than 0.8 and should invoke servers 150-3 (S3) and 150-4 (S4) and then evaluate the next policy 300 if each confidence level 462 is not greater than 0.8.

In the current example, since the confidence level 462 from the authentication server 150-2 (e.g., an RBA server) is below 0.8, the authentication broker device 200 should invoke authentication servers 150-3 (S3) and 150-4 (S4) for additional authentication. In the exemplary embodiment of FIG. 4, the exemplary authentication server 150-3 (S3) evaluates voice biometrics of the user and the exemplary authentication server 150-4 (S4) evaluates face biometrics of the user.

During step 475, the authentication broker device 200 sends a request to the actor 402 for voice and face data of the user. The actor 402 collects the requested information during step 478 and provides the collected information to the authentication broker device 200 during step 480.

The authentication broker device 200 provides the username and voice data of the user to authentication server 150-3 during step 482. The authentication server 150-3 evaluates the username and voice data and makes a determination 484 that the voice data "almost" matches the voice of the user. The authentication server 150-3 provides the result to the authentication broker device 200 during step 485 with a confidence level 486.

The authentication broker device 200 provides the username of the user and the face data of the user to authentication server 150-4 during step 488. The authentication server 150-4 evaluates the username and face data and makes a determination 490 that the face data "might" match the face of the user. The authentication server 150-4 provides the result to the authentication broker device 200 during step 492 with a confidence level 493.

The authentication broker device 200 evaluates the responses from the authentication servers 150-3 and 150-4 during step 494, based on a decision policy 330 (FIG. 3). For example, an exemplary decision policy 496 might indicate that the authentication broker device 200 should pass the actor 402 if the product of confidence levels 486, 493 is greater than 0.5 and fail the actor 402 otherwise. The authentication broker device 200 sends the final authentication result to the actor 402 during step 498.

As noted above, the decision logic of invoking the authentication sources, as well as the decision based on their response can optionally be tuned automatically using machine learning capabilities. For example, statistics and/or Bayesian scoring can be applied in a feedback manner to adjust one or more of the pre-flow policies 310, in-flow policies 320, post-flow policies 330 and/or algorithms based on system feedback. For example, if a particular transaction has a relatively high confidence, but lower than the pre-defined threshold, and the transaction successfully passes additional authentication, then the predefined threshold might be lowered for future similar transactions (so that fewer users are unnecessarily inconvenienced by additional authentication steps).

Figure 5:
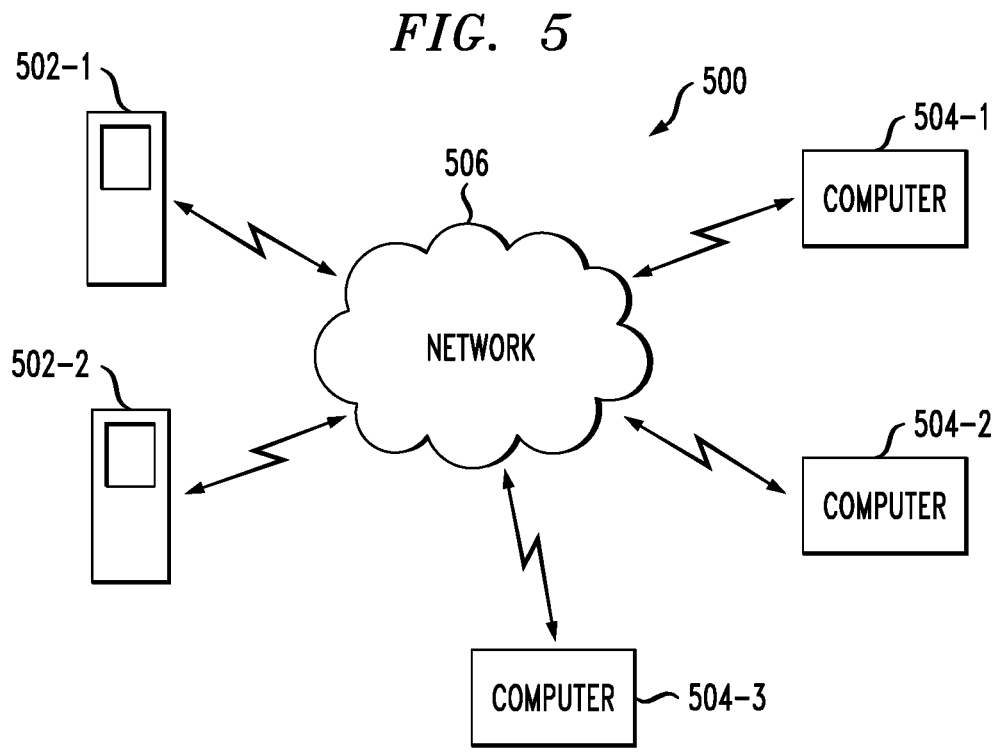
FIG. 5 is a diagram illustrating an example embodiment of communication systems that may incorporate functionality according to one or more embodiments of the invention.

FIG. 5 is a diagram illustrating an example embodiment of communication systems that may incorporate functionality according to one or more embodiments of the invention. As described herein, authentication techniques of the type associated with one or more embodiments of the invention may be implemented in a wide variety of different applications. By way merely of illustration, one exemplary communication system application that may incorporate such techniques will now be described with reference to FIG. 5.

As depicted in FIG. 5, a communication system 500 comprises a plurality of mobile devices 502-1 and 502-2 and computers 504-1, 504-2 and 504-3, configured to communicate with one another over a network 506. Any two or more of the devices 502 and 504 may correspond to cryptographic devices (such as client devices 110 or authentication broker device 200 in FIG. 1) configured to implement at least one embodiment of the invention, as described herein. It is also to be appreciated, however, that the techniques disclosed herein can be implemented in numerous other applications. For example, while FIG. 5 depicts network 506 as a wireless network, it is to be appreciated that one or more embodiments of the invention can be implemented in connection with a wired network.

Further, aspects of the present invention are described herein with reference to flowchart illustrations, communication diagrams and/or block diagrams of methods, apparatus, systems and computer program products according to embodiments of the invention. It is to be appreciated that each block of the flowchart illustrations and/or block diagrams, and combinations of blocks in the flowchart illustrations and/or block diagrams, can be implemented by computer program instructions. These computer program instructions may be provided to a processor of a special purpose computer or other specialized programmable data processing apparatus to produce a machine, such that the instructions, which execute via the processor of the computer or other specialized programmable data processing apparatus, implement the functions/acts specified in the flowchart and/or block diagram block or blocks.

As further described herein, such computer program instructions may also be stored in a computer readable medium that can direct a computer, other programmable cryptographic devices to function in a particular manner, such that the instructions stored in the computer readable medium produce an article of manufacture including instructions which implement the function/act specified in the flowchart and/or block diagram block or blocks. Accordingly, as further detailed below, at least one embodiment of the invention includes an article of manufacture tangibly embodying computer readable instructions which, when implemented, cause a cryptographic device to carry out techniques described herein.

The computer program instructions may also be loaded onto a computer or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart, communication diagrams and block diagrams in the figures illustrate the architecture, functionality, and operation of possible implementations of systems, methods and computer program products according to various embodiments of the present invention. In this regard, each block in the flowchart, communication diagrams or block diagrams may represent a component, segment, or portion of code, which comprises at least one executable instruction for implementing the specified logical function(s). It should be noted that the functions noted in the block may occur out of the order noted in the figures.

Additionally, the techniques detailed herein can also be implemented via a computer program product that includes computer useable program code stored in a computer readable storage medium in a data processing system, wherein the computer useable program code was downloaded over a network from a remote data processing system. The computer program product can also include, for example, computer useable program code that is stored in a computer readable storage medium in a server data processing system, wherein the computer useable program code is downloaded over a network to a remote data processing system for use in a computer readable storage medium with the remote system.

As will be appreciated by one skilled in the art, aspects of the present invention may take the form of an entirely hardware embodiment, an entirely software embodiment (including firmware, resident software, micro-code, etc.) or an embodiment combining software and hardware aspects that may be referred to herein as a "system."

Figure 6:
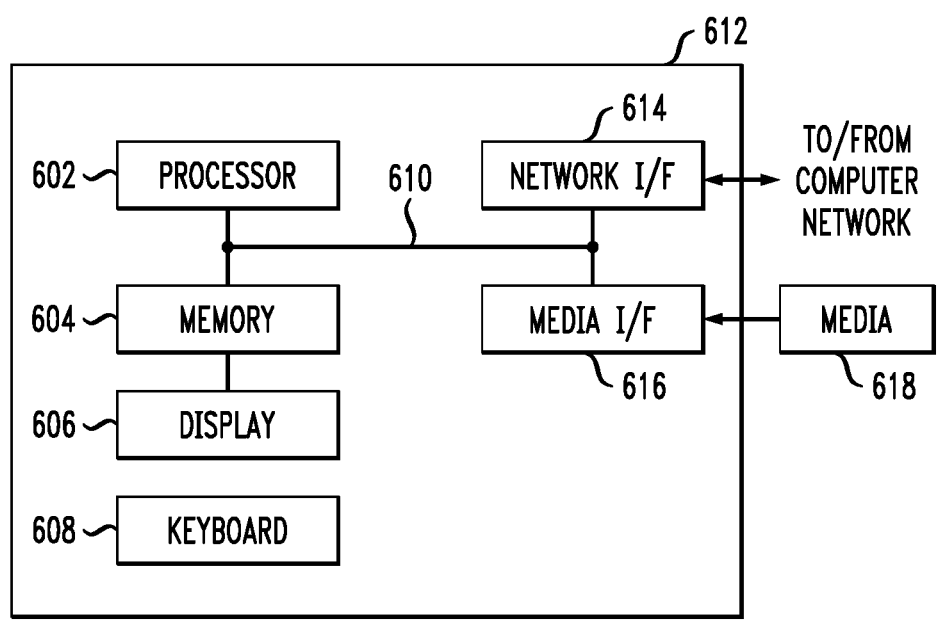
FIG. 6 is a system diagram of an exemplary cryptographic device on which at least one embodiment of the invention can be implemented.

FIG. 6 is a system diagram of an exemplary cryptographic device (such as client device 110 and/or authentication broker device 200 in FIG. 1, for example) on which at least one embodiment of the invention can be implemented. As depicted in FIG. 6, an example implementation employs, for example, a processor 602, a memory 604, and an input/output interface formed, for example, by a display 606 and a keyboard 608. The term "processor" as used herein can include one of multiple processing device(s), such as, for example, one that includes a central processing unit (CPU), a microprocessor, a microcontroller, an application-specific integrated circuit (ASIC), a field-programmable gate array (FPGA), and/or other foul's of processing circuitry. The term "memory" includes memory associated with a processor or CPU, such as, for example, random access memory (RAM), read only memory (ROM), a fixed memory device (for example, a hard drive), a removable memory device (for example, a diskette), a flash memory, etc. Further, the phrase "input/output interface," as used herein, includes a mechanism for inputting data to the processing unit (for example, a graphical user interface) and a mechanism for providing results associated with the processing unit (for example, a display).

The processor 602, memory 604, and input/output interface such as display 606 and keyboard 608 can be interconnected, for example, via bus 610 as part of a data processing unit 612. Suitable interconnections via bus 610, can also be provided to a network interface 614 (such as a network card), which can be provided to interface with a computer network, and to a media interface 616 (such as a diskette or compact disc read-only memory (CD-ROM) drive), which can be provided to interface with media 618.

Accordingly, computer software including instructions or code for carrying out the techniques detailed herein can be stored in associated memory devices (for example, ROM, fixed or removable memory) and, when ready to be utilized, loaded in part or in whole (for example, into RAM) and implemented by a CPU. Such software can include firmware, resident software, microcode, etc.

As noted above, a data processing system suitable for storing and/or executing program code includes at least one processor 602 coupled directly or indirectly to memory elements 604 through a system bus 610. The memory elements can include local memory employed during actual implementation of the program code, bulk storage, and cache memories which provide temporary storage of at least some program code in order to reduce the number of times code must be retrieved from bulk storage during implementation. Also, input/output (I/O) devices such as keyboards 608, displays 606, and pointing devices, can be coupled to the system either directly (such as via bus 610) or through intervening I/O controllers.

Network adapters such as network interface 614 (for example, a modem, a cable modem, an Ethernet card, etc.) can also be coupled to the system to enable the data processing system to become coupled to other data processing systems or remote printers or storage devices through intervening private or public networks.

As used herein, a "server" includes a physical data processing system (such as system 612 as depicted in FIG. 6) running a server program. It will be understood that such a physical server may or may not include a display and keyboard.

As noted, at least one embodiment of the invention can take the form of a computer program product embodied in a computer readable medium having computer readable program code embodied thereon. As will be appreciated, multiple combinations of computer readable media may be utilized. The computer readable medium can include a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. Examples include an electrical connection having one or more wires, a portable computer diskette, a hard disk, RAM, ROM, an erasable programmable read-only memory (EPROM), flash memory, an optical fiber, a portable CD-ROM, an optical storage device, a magnetic storage device, and/or any suitable combination of the foregoing. More generally, a computer readable storage medium may be any tangible medium that can contain, or store a program for use by or in connection with an instruction execution system, apparatus, or device.

Additionally, a computer readable signal medium may include a propagated data signal with computer readable program code embodied therein, for example, in baseband or as part of a carrier wave. Such a propagated signal may take any of a variety of forms such as, for example, electromagnetic, optical, or a suitable combination thereof. More generally, a computer readable signal medium may be any computer readable medium that is not a computer readable storage medium and that can communicate, propagate, or transport a program for use by or in connection with an instruction execution system, apparatus, or device.

Program code embodied on a computer readable medium can be transmitted using an appropriate medium such as, for example, wireless, wireline, optical fiber cable, radio frequency (RF), and/or a suitable combination of the foregoing. Computer program code for carrying out operations in accordance with one or more embodiments of the invention can be written in any combination of at least one programming language, including an object oriented programming language, and conventional procedural programming languages. The program code may execute entirely on a user's computer, partly on a user's computer, as a stand-alone software package, partly on a user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In light of the above descriptions, it should be understood that the components illustrated herein can be implemented in various forms of hardware, software, or combinations thereof, for example, application specific integrated circuit(s) (ASICS), functional circuitry, an appropriately programmed digital computer with associated memory, etc.

Terminology used herein is for the purpose of describing particular embodiments only and is not intended to be limiting of the invention. For example, the singular forms "a," "an" and "the" are intended to include the plural forms as well, unless clearly indicated otherwise. It will be further understood that the terms "comprises" and/or "comprising," as used herein, specify the presence of stated features, steps, operations, elements, and/or components, but do not preclude the presence or addition of another feature, step, operation, element, component, and/or group thereof.

Also, it should again be emphasized that the above-described embodiments of the invention are presented for purposes of illustration only. Many variations and other alternative embodiments may be used. For example, the techniques are applicable to a wide variety of other types of communication systems and cryptographic devices that can benefit from authentication techniques. Accordingly, the particular illustrative configurations of system and device elements detailed herein can be varied in other embodiments. These and numerous other alternative embodiments within the scope of the appended claims will be readily apparent to those skilled in the art.

What is claimed is:

1. A method comprising:
   receiving an authentication request from an application server seeking to authenticate a user for access to a protected resource associated with the application server;
   evaluating, using at least one processing device, one or more pre-flow rules and one or more characteristics of said authentication request to determine a plurality of authentication sources from a set of authentication sources to invoke for said authentication request and an order for said invocation;

communicating, using said at least one processing device, with at least a first authentication source in the set based on said determined invocation order to provide first authentication information of the user to said first authentication source and to obtain a first authentication result for the user from said first authentication source;

evaluating, using said at least one processing device, one or more in-flow rules and said first authentication result to determine if additional authentication of the user should be performed prior to determining a final authentication decision;

communicating, using said at least one processing device, with at least a second authentication source in the set based on one or more of said determined invocation order and a result of said evaluation of said one or more in-flow rules to provide second authentication information of the user to said second authentication source and to obtain a second authentication result for the user from said second authentication source, wherein the second authentication source is distinct from the first authentication source and performs an authentication type distinct from the authentication type of the first authentication source; and dynamically evaluating, using said at least one processing device, one or more decision rules and said first authentication result and said second authentication result to determine a combined authentication decision, wherein at least a given one of said first authentication result and said second authentication result comprises a non-binary response indicating an individual confidence level of said corresponding second authentication result obtained from a given one of said first authentication source and said second authentication source that generated said given authentication result, wherein said combined authentication decision comprises one or more of accept said user, reject said user and proceed to one or more third authentication sources in the set, wherein said non-binary response indicating an individual confidence level of said corresponding first or second authentication result is used to determine a selection of at least one particular subsequent authentication source from a subset of two or more authentication sources in the set that have not provided an authentication result for said authentication request.

2. The method of claim 1, wherein the authentication type of one or more of the first authentication source and the second authentication source comprise one or more of:
a credential-based authentication using a credential supplied by the user;
a risk-based authentication evaluating a risk posed by a set of risk factors associated with the authentication request;
an evaluation of one or more cookies stored on a device from at least one previous authentication; and
a biometric authentication.

3. The method of claim 1, wherein the invocation order comprises a list of a plurality of said authentication sources to contact one or more of sequentially, in parallel and a combination thereof.

4. The method of claim 1, wherein said one or more in-flow rules change said invocation order for said user dynamically during said authentication of said user.

5. The method of claim 1, wherein said decision rules are at least one of: customer-specific and updated using machine learning techniques.

6. The method of claim 1, wherein said decision rules combine said first and second authentication results into said combined authentication decision.

7. The method of claim 1, wherein the selection of the at least one particular subsequent authentication source dynamically updates the order for said invocation.

8. An article of manufacture comprising a non-transitory processor-readable storage medium having processor-readable instructions embodied thereon which, when implemented, cause at least one processing device to carry out the following steps:

receiving an authentication request from an application server seeking to authenticate a user for access to a protected resource associated with the application server;

evaluating, using said at least one processing device, one or more pre-flow rules and one or more characteristics of said authentication request to determine a plurality of authentication sources from a set of authentication sources to invoke for said authentication request and an order for said invocation;

communicating, using said at least one processing device, with at least a first authentication source in the set based on said determined invocation order to provide first authentication information of the user to said first authentication source and to obtain a first authentication result for the user from said first authentication source:

evaluating, using said at least one processing device, one or more in-flow rules and said first authentication result to determine if additional authentication of the user should be performed prior to determining a final authentication decision;

communicating, using said at least one processing device, with at least a second authentication source in the set based on one or more of said determined invocation order and a result of said evaluation of said one or more in-flow rules to provide second authentication information of the user to said second authentication source and to obtain a second authentication result for the user from said second authentication source, wherein the second authentication source is distinct from the first authentication source performs an authentication type distinct from the authentication type of the first authentication source; and dynamically evaluating, using said at least one processing device, one or more decision rules and said first authentication result and said second authentication result to determine a combined authentication decision, wherein at least a given one of said first authentication result and said second authentication result comprises a non-binary response indicating an individual confidence level of said corresponding first or second authentication result obtained from a given one of said first authentication source and said second authentication source that generated said given authentication result, wherein said combined authentication decision comprises one or more of accept said user, reject said user and proceed to one or more third authentication sources in the set, wherein said non-binary response indicating an individual confidence level of said corresponding first or second authentication result is used to determine a selection of at least one particular subsequent authentication source from a subset of two or more authentication sources in the set that have not provided an authentication result for said authentication request.

9. The article of manufacture of claim 8, wherein the invocation order comprises a list of a plurality of said authentication sources to contact one or more of sequentially, in parallel and a combination thereof.

10. The article of manufacture of claim 8, wherein said one or more in-flow rules change said invocation order for said user dynamically during said authentication of said user.

11. The article of manufacture of claim 8, wherein said decision rules are at least one of: customer-specific and updated using machine learning techniques.

12. The article of manufacture of claim 8, wherein said decision rules combine said first and second authentication results into said combined authentication decision.

13. An apparatus, comprising:
a memory; and
at least one processing device coupled to the memory and configured to:
receive an authentication request from an application server seeking to authenticate a user for access to a protected resource associated with the application server;
evaluate, using said at least one processing device, one or more pre-flow rules and one or more characteristics of said authentication request to determine a plurality of authentication sources from a set of authentication sources to invoke for said authentication request and an order for said invocation;
communicate, using said at least one processing device, with at least a first authentication source in the set based on said determined invocation order to provide first authentication information of the user to said first authentication source and to obtain a first authentication result for the user from said first authentication source: evaluate, using said at least one processing device, one or more in-flow rules and said first authentication result to determine if additional authentication of the user should be performed prior to determining a final authentication decision;
communicate, using said at least one processing device, with at least a second authentication source in the set based on one or more of said determined invocation order and a result of said evaluation of said one or more in-flow rules to provide second authentication information of the user to said second authentication source and to obtain a second authentication result for the user from said second authentication source, wherein the second authentication source is distinct from the first authentication source and performs an authentication type distinct from the authentication type of the first authentication source; and
dynamically evaluate, using said at least one processing device, one or more decision rules and said first authentication result and said second authentication result to determine a combined authentication decision, wherein at least a given one of said first authentication result and said second authentication result comprises a non-binary response indicating an individual confidence level of said corresponding first or second authentication result obtained from a given one of said first authentication source and said second authentication source that generated said given authentication result, wherein said combined authentication decision comprises one or more of accept said user, reject said user and proceed to one or more third authentication sources in the set, wherein said non-binary response indicating an individual confidence level of said corresponding first or second authentication result is used to determine a selection of at least one particular subsequent authentication source from a subset of two or more authentication sources in the set that have not provided an authentication result for said authentication request.

14. The apparatus of claim 13, wherein the authentication type of one or more of the first authentication source and the second authentication source comprise one or more of:
a credential-based authentication using a credential supplied by the user;
a risk-based authentication evaluating a risk posed by a set of risk factors associated with the authentication request;
an evaluation of one or more cookies stored on a device from at least one previous authentication; and
a biometric authentication.

15. The apparatus of claim 13, wherein the invocation order comprises a list of a plurality of said authentication sources to contact one or more of sequentially, in parallel and a combination thereof.

16. The apparatus of claim 13, wherein said one or more in-flow rules change said invocation order for said user dynamically during said authentication of said user.

17. The apparatus of claim 13, wherein said decision rules are customer-specific.

18. The apparatus of claim 13, wherein said decision rules are updated using machine learning techniques.

19. The apparatus of claim 13, wherein said decision rules combine said first and second authentication results into said combined authentication decision.

* * * * *